(12) United States Patent
Kang et al.

(10) Patent No.: US 7,587,894 B2
(45) Date of Patent: Sep. 15, 2009

(54) EXHAUST STRUCTURE FOR ENGINE

(75) Inventors: Seung Tak Kang, Seoul (KR); Chang Min Choi, Seoul (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 536 days.

(21) Appl. No.: 11/254,815

(22) Filed: Oct. 21, 2005

(65) Prior Publication Data
US 2006/0123774 A1 Jun. 15, 2006

(30) Foreign Application Priority Data
Dec. 10, 2004 (KR) .................. 10-2004-0104375

(51) Int. Cl.
*F01N 3/02* (2006.01)
(52) U.S. Cl. .......................... 60/309; 60/324
(58) Field of Classification Search .............. 60/309, 60/319, 320, 324
See application file for complete search history.

(56) References Cited

U.S. PATENT DOCUMENTS

| | | | |
|---|---|---|---|
| 2,420,700 A | | 5/1947 | Curphy |
| 2,446,631 A | * | 8/1948 | Burks ..................... 454/41 |
| 2,494,016 A | | 1/1950 | Taylor |
| 2,721,619 A | * | 10/1955 | Cheairs ................... 181/244 |
| 2,732,913 A | * | 1/1956 | Higgins ................... 96/386 |
| 3,426,526 A | * | 2/1969 | Tornmarck ............... 60/309 |
| 4,060,985 A | | 12/1977 | Fukushima |
| 4,187,163 A | * | 2/1980 | Steinke et al. ........... 204/428 |
| 4,450,934 A | * | 5/1984 | Davis ..................... 181/228 |
| 4,586,941 A | * | 5/1986 | Cooley ................... 96/147 |
| 5,170,020 A | * | 12/1992 | Kruger et al. ............ 181/211 |
| 5,321,215 A | * | 6/1994 | Kicinski .................. 181/211 |
| 5,808,245 A | * | 9/1998 | Wiese et al. ............. 181/255 |
| 5,873,429 A | * | 2/1999 | Qutub .................... 180/309 |
| 6,430,921 B1 | * | 8/2002 | Stuart et al. ............. 60/309 |
| 6,550,573 B2 | * | 4/2003 | Wagner et al. ........... 181/255 |
| 6,802,387 B1 | * | 10/2004 | Kreger et al. ............ 181/228 |
| 6,832,872 B2 | * | 12/2004 | Koelm et al. ............ 404/108 |
| 6,868,670 B1 | * | 3/2005 | Schellin .................. 60/309 |
| 6,892,854 B2 | * | 5/2005 | Wagner et al. ........... 181/258 |
| 7,065,961 B1 | * | 6/2006 | Batten, Jr. ............... 60/309 |
| 7,114,330 B1 | * | 10/2006 | Schellin .................. 60/309 |
| 7,347,044 B1 | * | 3/2008 | Lubenow et al. ......... 60/309 |

FOREIGN PATENT DOCUMENTS

| | | |
|---|---|---|
| JP | 58-162714 A | 9/1983 |
| JP | 58-202323 A | 11/1983 |
| JP | 01-063720 | 4/1989 |
| JP | 02-124218 | 10/1990 |
| WO | WO-03/027453 A1 | 4/2003 |

* cited by examiner

*Primary Examiner*—Thomas E Denion
*Assistant Examiner*—Diem Tran
(74) *Attorney, Agent, or Firm*—Birch, Stewart, Kolasch & Birch, LLP

(57) ABSTRACT

An exhaust structure for an engine is disclosed. The exhaust structure includes an exhaust line, through which the exhaust gas discharged from the engine passes. The exhaust line has a double pipe structure capable of preventing the condensed water formed in the exhaust line from entering the engine, so that it is possible to prevent engine failure, and thus, to achieve an enhancement in the durability and reliability of the engine.

10 Claims, 3 Drawing Sheets

⇒ exhaust gas
--→ condensed water

EXHAUST STRUCTURE FOR ENGINE

BACKGROUND OF THE INVENTION

1. Field of the Invention

The present invention relates to an exhaust structure for an engine, and, more particularly, to an exhaust structure for an engine wherein an exhaust line, through which exhaust gas discharged from the engine, has a double pipe structure to prevent condensed water, formed in the exhaust line, from entering the engine, so that it is possible to achieve an enhancement in the durability and reliability of the engine.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic view illustrating an exhaust structure for an engine included in a conventional cogeneration system.

As shown in FIG. 1, the exhaust structure, which is included in the conventional cogeneration system to outwardly discharge exhaust gas generated from an engine 2, includes an exhaust gas discharge line 4 connected to the engine 2, and adapted to outwardly guide exhaust gas discharged from the engine 2, and a muffler 10 arranged in the exhaust gas discharge line 4 at a level higher than the engine 2, and adapted to reduce noise of the exhaust gas.

The muffler 10 includes a muffler body 16 having an inlet 12 and an outlet 14, through which the exhaust gas discharged from the engine 2 passes, and a condensed water outlet 18 formed at the bottom of the muffler body 16 to outwardly discharge condensed water formed in the muffler body 16.

The exhaust gas inlet 12 and exhaust gas outlet 14 communicate with the exhaust gas discharge line 4.

A plug 20 is mounted to the condensed water outlet 18, in order to open or close the condensed water outlet 18.

Hereinafter, operation of the exhaust structure having the above-mentioned configuration will be described.

When the engine 2 operates, high-temperature exhaust gas is discharged from the engine 2. The exhaust gas is then outwardly discharged via the exhaust gas discharge line 4 and muffler body 16.

At this time, condensed water is generated in the muffler body 16 and exhaust gas discharge line 4 due to a temperature difference between the high-temperature exhaust gas and the atmosphere.

Such condensed water is accumulated in accordance with continued operation of the engine 2. Accordingly, it is necessary to periodically outwardly discharge the accumulated condensed water by opening the condensed water outlet 18.

In the above-mentioned conventional exhaust structure, however, it is impossible to remove condensed water generated in the exhaust gas discharge line 4. For this reason, there is a problem in which the condensed water may flow backward into the engine 2, thereby causing a failure of the engine 2.

SUMMARY OF THE INVENTION

The present invention has been made in view of the above-mentioned problem incurred in the related art, and an object of the invention is to provide an exhaust structure for an engine which is capable of preventing condensed water formed in an exhaust gas discharge line from flowing backward into the engine, thereby preventing engine failure, and thus, achieving an enhancement in the durability of the engine.

In accordance with the present invention, these objects are accomplished by providing an exhaust structure for an engine comprising: a first exhaust pipe connected to the engine, and adapted to guide exhaust gas discharged from the engine, the first exhaust pipe having an upwardly extending end portion; and a second exhaust pipe having a lower end portion, through which the upwardly extending end portion of the first exhaust pipe extends.

The second exhaust pipe may have an inner surface radially spaced apart from an outer surface of the upwardly extending end portion of the first exhaust pipe by a predetermined gap.

The lower end portion of the second exhaust pipe may have a diameter increasing gradually as the lower end portion of the second exhaust pipe extends downwardly toward a lower end of the second exhaust pipe.

The lower end of the second exhaust pipe may be sealed to enable condensed water flowing along an inner surface of the second exhaust pipe to be collected in the lower end portion of the second exhaust pipe.

The exhaust structure may further comprise a condensed water outlet provided at the lower end of the second exhaust pipe to enable the condensed water collected in the lower end portion of the second exhaust pipe to be outwardly discharged.

The exhaust structure may further comprise a plug mounted to the condensed water outlet.

The exhaust structure may further comprise a muffler connected to an upper end of the second exhaust pipe.

The exhaust structure may further comprise a check valve mounted in the second exhaust pipe. In this case, the check valve is openable only in a direction corresponding to a normal flow direction of the exhaust gas.

The exhaust structure may further comprise at least one condensed water hole formed at a peripheral portion of the check valve, and adapted to allow the condensed water in the second exhaust pipe to flow downwardly through the condensed water hole.

The at least one condensed water hole comprises a plurality of condensed water holes uniformly spaced apart from one another along the peripheral portion of the check valve.

Since the exhaust line, through which the exhaust gas discharged from the engine passes, has a double pipe structure capable of preventing the condensed water formed in the exhaust line from entering the engine, it is possible to prevent engine failure, and thus, to achieve an enhancement in the durability and reliability of the engine.

Also, since the check valve, which is openable only in a direction corresponding to a normal flow direction of the exhaust gas, is mounted in the second exhaust pipe, it is possible to prevent the condensed water from entering the first exhaust pipe even when a large amount of condensed water is formed in the second exhaust pipe, while enabling free discharge of the exhaust gas.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Figure 1:
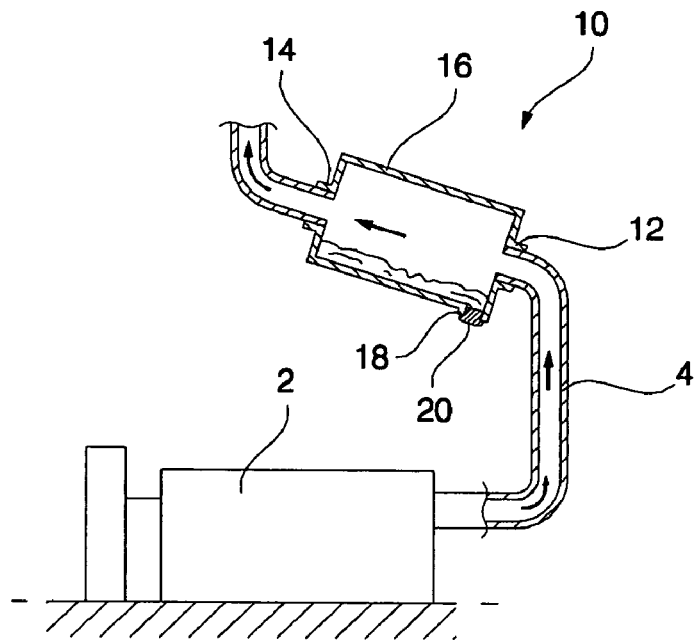
FIG. 1 is a schematic view illustrating an exhaust structure for an engine included in a conventional cogeneration system.
Figure 2:
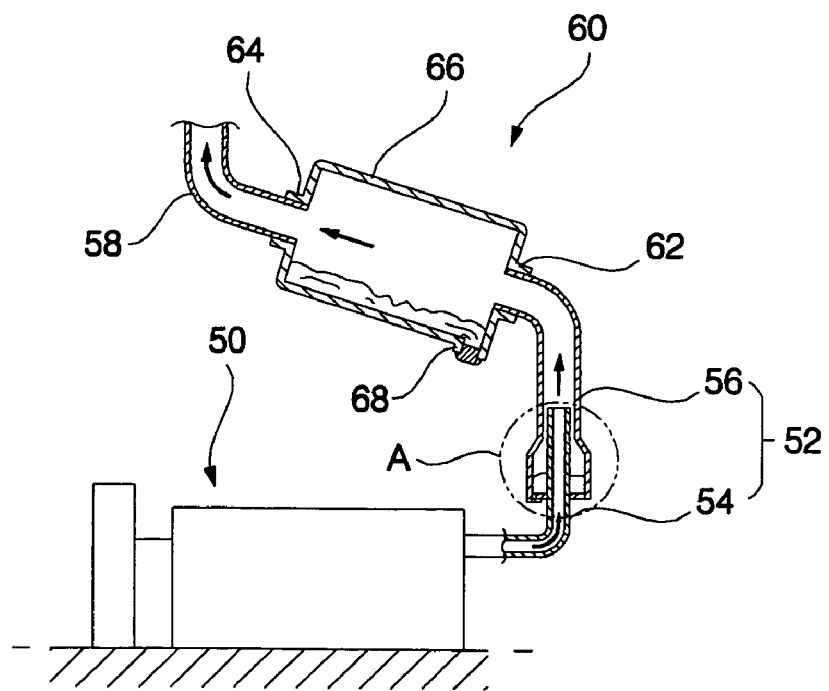
FIG. 2 is a schematic view illustrating an exhaust structure for an engine according to a first embodiment of the present invention.
Figure 3:
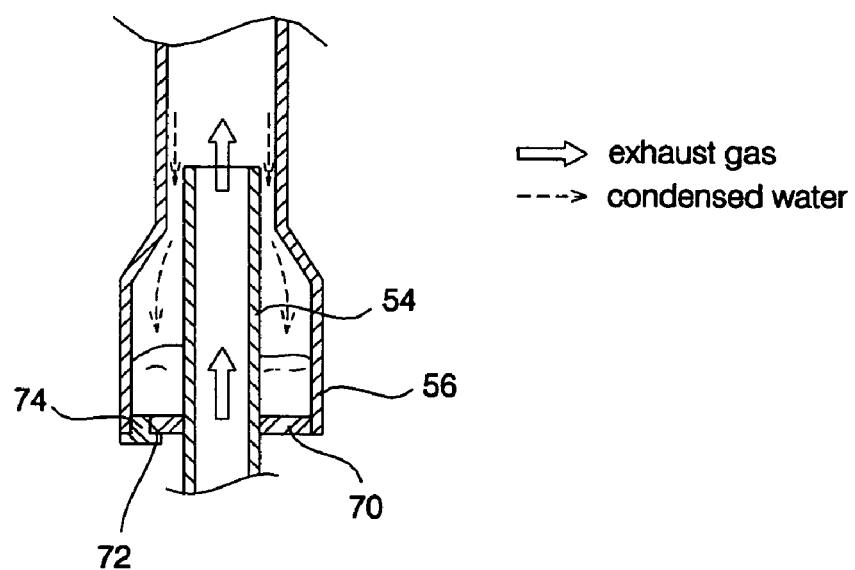
FIG. 3 is an enlarged sectional view corresponding to a portion "A" of FIG. 2.

FIG. 2 is a schematic view illustrating an exhaust structure for an engine according to a first embodiment of the present invention. FIG. 3 is an enlarged sectional view corresponding to a portion "A" of FIG. 2.

As shown in FIGS. 2 and 3, the exhaust structure according to the first embodiment of the present invention, which is adapted to outwardly discharge exhaust gas generated from an engine 50, includes an exhaust gas discharge line 52 adapted to outwardly guide exhaust gas discharged from the engine 50.

The exhaust gas discharge line 52 includes a first exhaust pipe 54 connected to the engine 50 to guide the exhaust gas discharged from the engine 50, and a second exhaust pipe 56 connected to the first exhaust pipe 54 to guide the exhaust gas emerging from the first exhaust pipe 54.

The first exhaust pipe 54 has an inlet or lower end connected to the engine 50, and an outlet or upper end connected to the second exhaust pipe 56. The first exhaust pipe 54 has an upwardly extending end portion formed at the side of the upper end of the first exhaust pipe 54. The upwardly extending end portion of the first exhaust pipe 54 is inserted into the second exhaust pipe 56. The second exhaust pipe 56 has an inlet or lower end fitted around the upwardly extending end portion of the first exhaust pipe 54, and an outlet or upper end connected to a muffler 60 adapted to reduce noise of the exhaust gas.

The muffler 60 includes a muffler body 66 arranged at a level higher than the engine 50, and provided with an exhaust gas inlet 62 and an exhaust gas outlet 64, and a discharge hole 68 formed at the bottom of the muffler body 66 to outwardly discharge condensed water formed in the muffler body 66.

The second exhaust pipe 56 is connected to the exhaust gas inlet 62 of the muffler body 66. A third exhaust pipe 58 is connected to the exhaust gas outlet 64 of the muffler body 66, in order to outwardly guide the exhaust gas emerging from the muffler body 66.

The outer surface of the upwardly extending end portion of the first exhaust pipe 54 received in the second exhaust pipe 56 is radially spaced apart from the inner surface of the portion of the second exhaust pipe 56 receiving the upwardly extending end portion of the first exhaust pipe 54, in order to prevent the condensed water, which flows along the inner surface of the second exhaust pipe 56, from entering the first exhaust pipe 54. The second exhaust pipe 56 has an enlarged portion at the side of the inlet or lower end of the second exhaust pipe 56. The enlarged portion of the second exhaust pipe 56 has a diameter increasing gradually toward the lower end of the second exhaust pipe 56.

The lower end of the second exhaust pipe 56 is opened, and has a diameter larger than that of the first exhaust pipe 54.

It is preferred that a seal member 70 be fitted in the lower end of the second exhaust pipe 56 around the first exhaust pipe 54, in order to enable the condensed water flowing downward along the inner surface of the second exhaust pipe 56 to be collected in an annular space defined in the enlarged portion of the second exhaust pipe 56 around the outer surface of the first exhaust pipe 54.

A condensed water outlet 72 is formed at the seal member 70 to outwardly discharge the collected condensed water. A plug 74 is mounted to the condensed water outlet 72 to open or close the condensed water outlet 72.

Meanwhile, the first exhaust pipe 54 may have an inclined outlet end portion without being limited to the above-described embodiment, taking into consideration a pressure resistance generated in the first exhaust pipe 54 during the discharge of the exhaust gas.

Hereinafter, operation of the exhaust structure having the above-described configuration according to the first embodiment of the present invention will be described.

When the engine 50 discharges exhaust gas in accordance with operation thereof, the exhaust gas enters the muffler body 66 after sequentially passing through the first exhaust pipe 54 and second exhaust pipe 56.

The exhaust gas is reduced in noise while passing through the muffler body 66, and is then outwardly discharged through the third exhaust pipe 58.

At this time, condensed water is generated in the muffler body 66, first exhaust pipe 54, and second exhaust pipe 56 due to a temperature difference between the high-temperature exhaust gas and the atmosphere.

The condensed water generated in the muffler body 66 is accumulated in the bottom of the muffler body 66. The accumulated condensed water is subsequently outwardly discharged through the discharge hole 68.

The condensed water generated in the second exhaust pipe 56 flows downward along the inner surface of the second exhaust pipe 56 toward the annular space defined in the enlarged portion of the second exhaust pipe 56 around the outer surface of the first exhaust pipe 54, so that the condensed water is collected in the enlarged portion of the second exhaust pipe 56.

When a large amount of condensed water is accumulated in the enlarged portion of the second exhaust pipe 56, the condensed water may be outwardly discharged through the condensed water outlet 72 which is opened in accordance with separation of the plug 74 from the condensed water outlet 72.

Accordingly, it is possible to prevent the condensed water generated in the interior of the exhaust structure from entering the engine 50 via the first exhaust pipe 54.

Figure 4:
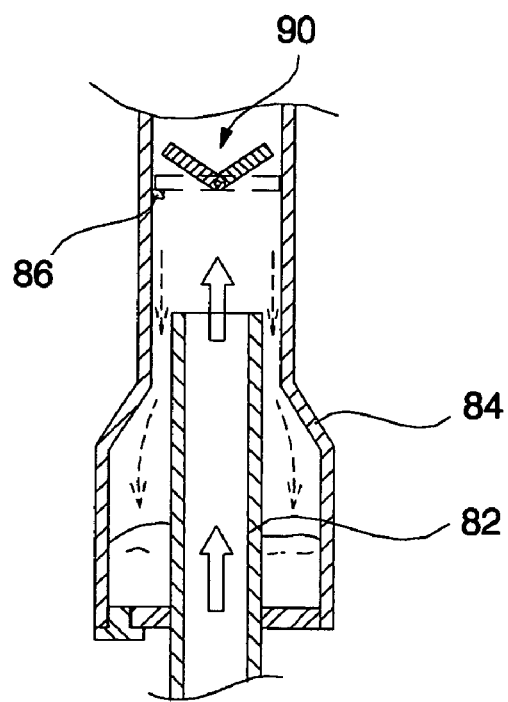
FIG. 4 is a sectional view illustrating an exhaust structure for an engine according to a second embodiment of the present invention.
Figure 5:
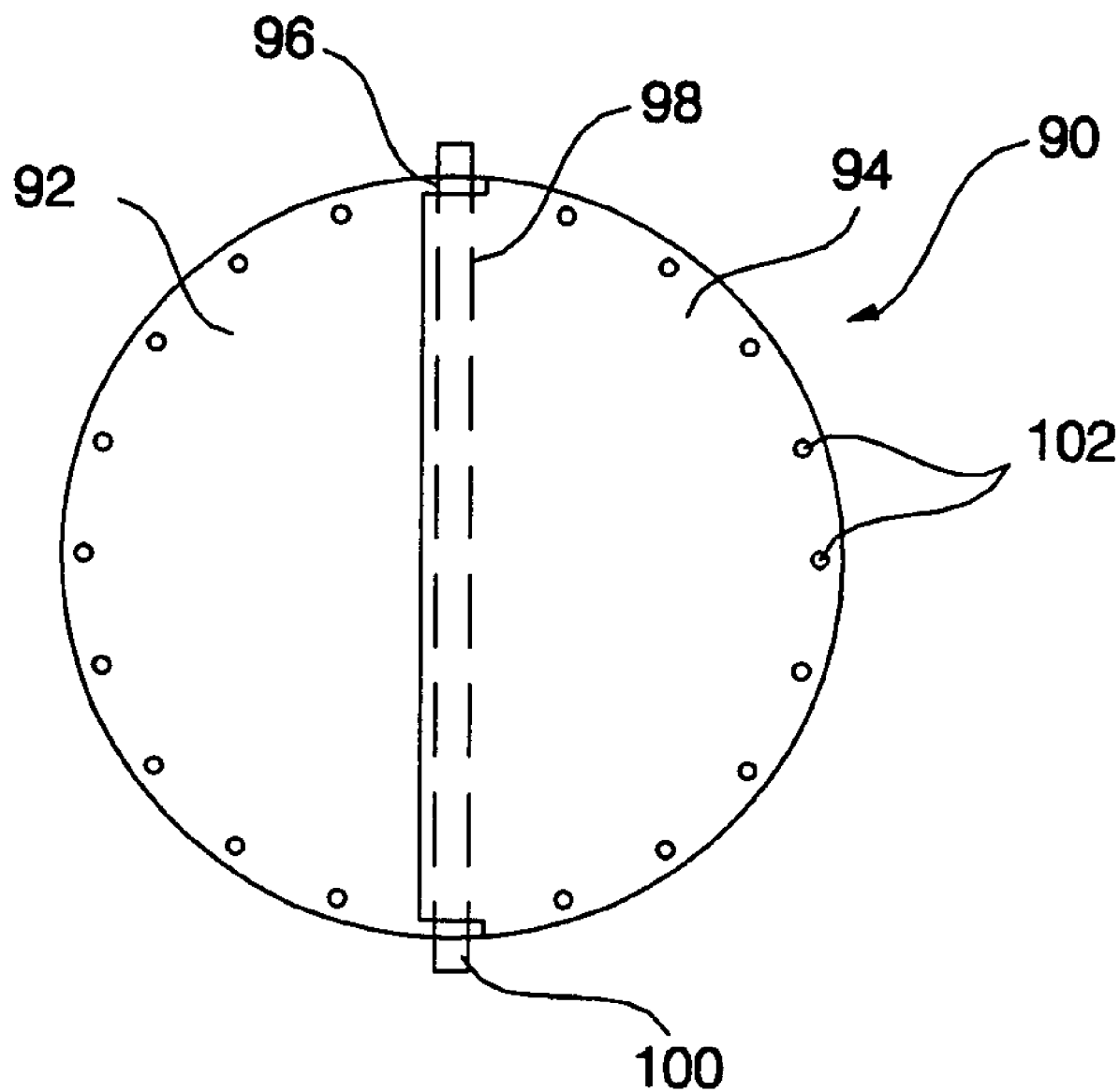
FIG. 5 is a plan view illustrating a check valve according to the second embodiment of the present invention.

FIG. 4 is a sectional view illustrating an exhaust structure for an engine according to a second embodiment of the present invention. FIG. 5 is a plan view illustrating a check valve according to the second embodiment of the present invention.

As shown in FIGS. 4 and 5, the exhaust structure according to the second embodiment of the present invention includes a first exhaust pipe 82 connected to an engine (not shown) to receive exhaust gas discharged from the engine, and a second exhaust pipe 84 connected to the first exhaust pipe 54 such that an upwardly extending outlet end portion of the first exhaust pipe 54 is fitted in an inlet end portion of the second exhaust pipe 84. A check valve 90 is arranged in the second exhaust pipe 84. The check valve 90 is openable only in a direction corresponding to a normal flow direction of the exhaust gas. The other configuration of the exhaust structure according to the second embodiment is identical to that of the first embodiment, so that no detailed description thereof will be given.

The check valve 90 is hingably coupled to the inner surface of the second exhaust pipe 84.

The check valve 90 includes a first valve member 92 and a second valve member 94, each of which has a semicircular shape. The first and second valve members 92 and 94 are hingably coupled to each other.

The first and second valve members 92 and 94 respectively have first and second hinge portions 96 and 98 which are coupled to each other to form an axial hinge hole. A hinge shaft 100 is fitted between the first and second hinge portions 96 and 98 such that the hinge shaft 100 extends through the axial hinge hole defined by the first and second hinge portions 96 and 98.

The hinge shaft 100 has opposite ends rotatably coupled to the inner surface of the second exhaust pipe 84.

A plurality of condensed water holes 102 are formed through each of the first and second valve members 92 and 94 along a peripheral portion of the associated valve member 92 or 94, in order to allow the condensed water flowing along the inner surface of the second exhaust pipe 84 to pass through the associated valve member 92 or 94.

The condensed water holes 102 are uniformly spaced apart from one another in a circumferential direction.

Stoppers 86 are provided at the inner surface of the second exhaust pipe 84 to prevent the first and second valve members 92 and 94 from being hingably moved in a downward direction by the condensed water in the second exhaust pipe 84.

The stoppers 86 are protruded from the inner surface of the second exhaust pipe 84 while being uniformly spaced apart from one another in a circumferential direction so that the stoppers 86 do not interfere with the flow of the condensed water.

In the exhaust structure having the above-described configuration according to the second embodiment of the present invention, the check valve 90 cuts off the condensed water, which flows along the central axes of the second exhaust pipe 84 due to a phenomenon wherein a large amount of condensed water passes through the second exhaust pipe 84. Accordingly, it is possible to prevent the condensed water from entering the first exhaust pipe 82.

The condensed water cut off by the check valve 90 flows downward along the inner surface of the second exhaust pipe 84 through the condensed water holes 102.

On the other hand, the exhaust gas discharged from the engine (not shown) can pass through the second exhaust pipe 84 without being obstructed by the check valve 90 because the check valve 90 is hingably moved in an upward direction to be opened by the exhaust gas reaching the check valve 90.

Accordingly, the exhaust gas can flow toward a muffler (not shown) through the second exhaust pipe 84 without any interference.

As apparent from the above description, the exhaust structure according to the present invention has various effects.

That is, since the exhaust line, through which the exhaust gas discharged from the engine passes, has a double pipe structure capable of preventing the condensed water formed in the exhaust line from entering the engine, it is possible to prevent engine failure, and thus, to achieve an enhancement in the durability and reliability of the engine.

Also, since the check valve, which is openable only in a direction corresponding to a normal flow direction of the exhaust gas, is mounted in the second exhaust pipe, it is possible to prevent the condensed water from entering the first exhaust pipe even when a large amount of condensed water is formed in the second exhaust pipe, while enabling free discharge of the exhaust gas.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An exhaust structure for an engine comprising:
   a first exhaust pipe connected to the engine, and adapted to guide exhaust gas discharged from the engine, the first exhaust pipe having an upwardly extending end portion;
   a second exhaust pipe having a lower end portion, through which the upwardly extending end portion of the first exhaust pipe extends; and
   a check valve mounted in the second exhaust pipe to open and close the second exhaust pipe,
   wherein the second exhaust pipe has an inner surface radially spaced apart from an outer surface of the upwardly extending end portion of the first exhaust pipe by a predetermined gap, and
   wherein at least one condensed water hole is formed at a peripheral portion of the check valve, and adapted to allow the condensed water in the second exhaust pipe to flow downwardly through the condensed water hole.

2. The exhaust structure according to claim 1, wherein the lower end portion of the second exhaust pipe has a diameter increasing gradually as the lower end portion of the second exhaust pipe extends downwardly toward a lower end of the second exhaust pipe.

3. The exhaust structure according to claim 1, wherein the lower end of the second exhaust pipe is sealed to enable condensed water flowing along an inner surface of the second exhaust pipe to be collected in the lower end portion of the second exhaust pipe.

4. The exhaust structure according to claim 1, further comprising:
   a muffler connected to an upper end of the second exhaust pipe.

5. The exhaust structure according to claim 1, wherein the at least one condensed water hole comprises a plurality of condensed water holes uniformly spaced apart from one another along the peripheral portion of the check valve.

6. The exhaust structure according to claim 1, wherein the check valve is hingably coupled to the inner surface of the second exhaust pipe.

7. The exhaust structure according to claim 1, wherein the check valve comprises a first valve member and a second valve member which are hingably coupled to each other, each of the first and second valve members having a semicircular shape.

8. The exhaust structure according to claim 1, further comprising:
   stoppers provided at the inner surface of the second exhaust pipe, and adapted to prevent the check valve from being hingably moved in a downward direction by the condensed water in the second exhaust pipe.

9. The exhaust structure according to claim 1, further comprising:
   a condensed water outlet provided at the lower end of the second exhaust pipe to enable the condensed water collected in the lower end portion of the second exhaust pipe to be outwardly discharged.

10. The exhaust structure according to claim 9, further comprising:
    a plug mounted to the condensed water outlet.

* * * * *